March 26, 1946.  J. D. HORVIT  2,397,316
WELTED SHOE
Filed Sept. 23, 1943
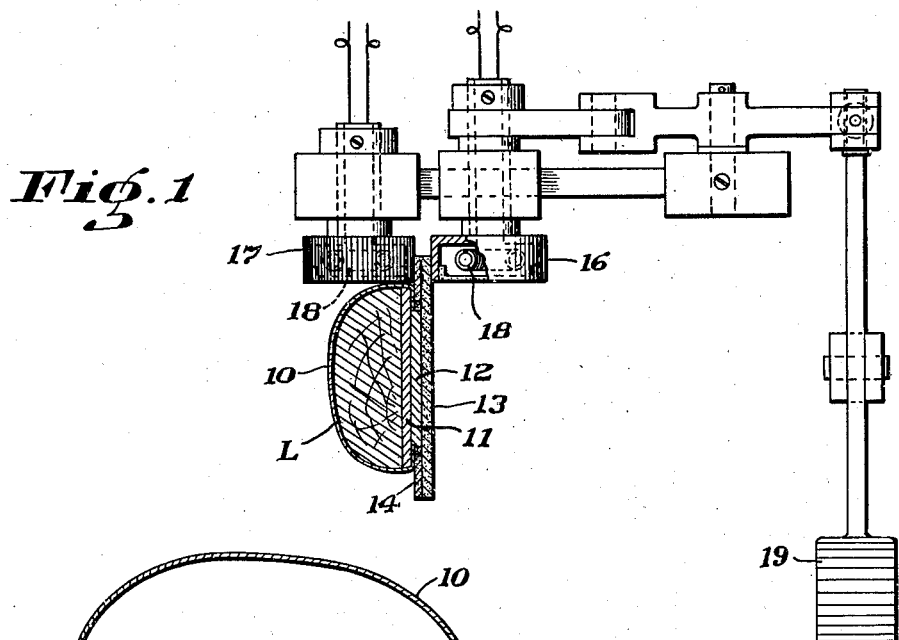
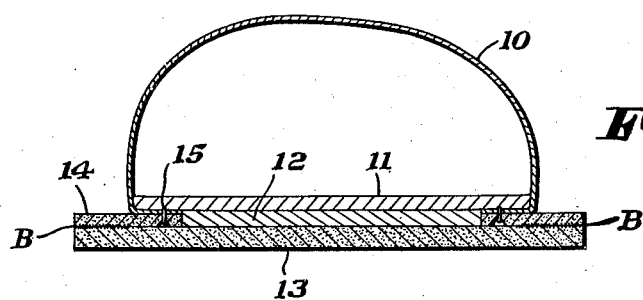
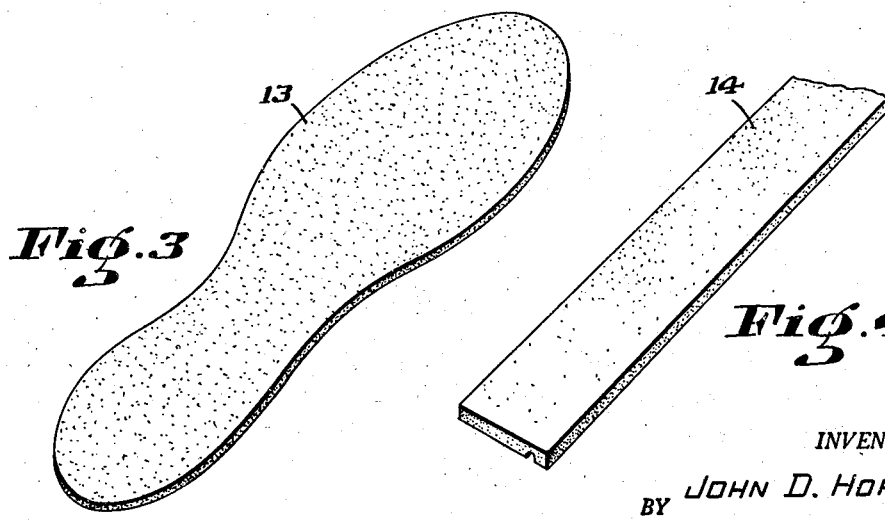
INVENTOR.
JOHN D. HORVIT
BY Spear, Rawlings & Spear.
ATTORNEYS Patented Mar. 26, 1946

2,397,316

UNITED STATES PATENT OFFICE 2,397,316

WELTED SHOE

John D. Horvit, Roxbury, Mass., assignor to Spencer Shoe Corporation, Boston, Mass., a corporation of Massachusetts Application September 23, 1943, Serial No. 503,542

1 Claim. (Cl. 36—19.5)

This invention relates to a welt shoe.

In the conventional welt shoe as conventionally made using conventional materials, the welt and outsole are stitched together.

The broad object of my present invention is to provide a serviceable welt shoe in which the welt and outsole are united to each other without stitching. By eliminating this stitching operation, and the equipment necessary to perform it, I greatly simplify the manufacture of the shoe as well as reducing its cost.

Other objects and advantages will appear as the description proceeds.

According to my invention I substitute for the conventional welt and outsole materials conventionally used in the manufacture of a welt shoe, a welt and outsole composed of felted fibers impregnated with a thermoplastic.

After assembling my welt and outsole in the proper relationship with each other and with the usual upper structure, insole and filler of the shoe, I subject the lasted shoe to sufficient heat and pressure in the region of the welt to develop a thermoplastic bond between said parts.

While I prefer that both the welt and the outsole shall be composed of felted fibers impregnated with a thermoplastic, the welt in some instances may be composed entirely of unimpregnated material, such as leather, in which case the thermoplastic from the outsole will be leached into the unimpregnated welt during the bonding step. In still other instances, the outsole may be composed entirely of thermoplastic material.

For my fibers I may use any desired kind which will give the qualities wanted in the final product. Wool, cotton, rayon, and casein fibres, or mixtures thereof, have been found to be well suited.

For my plastic, I may use any of a wide variety of synthetic or natural resins, either in scrap form or otherwise. If the resin is synthetic, it may be of the phenol-formaldehyde, urea, or methylacrylic types, or I may use vinyl acetate or chloride polymers or co-polymers, styrene, vinyledene, cellulose acetate, or cellulose acetate butyrate and others.

I may produce my plastic impregnated felted fibrous outsole and/or welt in any desired manner, although I prefer to produce them by the methods disclosed in my applications Serial No. 503,541 filed Sept. 23, 1943, and Serial No. 503,700 filed Sept. 24, 1943.

In the accompanying drawing:

Fig. 1 is plan view showing apparatus for subjecting the outsole and welt of a welt shoe in accordance with my invention, to sufficient heat and pressure to develop a thermoplastic bond between said parts, the shoe being shown in cross-section and the outsole thereof at least being composed of thermoplastic material or of felted fibres impregnated with a thermoplastic, the welt thereof being either a non-impregnated material or a thermoplastic-impregnated felted fibrous material.

Fig. 2 is a cross-section through the thus bonded shoe, and

Figs. 3 and 4 are perspective views of the outsole and welt, respectively, before bonding.

I have indicated generally at 10 the upper structure of a welt shoe having an insole 11, filler 12, outsole 13 and welt 14. The upper structure, insole and filler are made of conventional materials, and the upper structure is united to the welt in any conventional manner as by usual inseam stitching, tacking or stapling 15.

Preferably, although not necessarily, both the outsole and the welt are composed of plastic impregnated felted fibres which were impregnated and molded to final article shape by the methods disclosed in my applications aforesaid. The welt, however, may be of non-impregnated material, as leather, and the outsole may be composed entirely of thermoplastic material.

The several parts of the shoe are temporarily tacked to the last L in their proper relationship. The lasted shoe is next subjected to sufficient heat and pressure in the region of the welt to cause the welt and outsole to be firmly bonded to each other. In this action the thermoplastic impregnant of the outsole and the welt (if the welt contains a thermoplastic impregnant), leach into each other and on hardening form a thermoplastic bond B, thereby avoiding the necessity of stitching these parts together.

The bonding step may be performed in any suitable manner and by any convenient apparatus. In Fig. 1 I have illustrated a form of apparatus comprising a pair of suitably guarded spaced pressure rolls 16 and 17 which are supplied with heat in any suitable manner, as by the electrical heating means indicated conventionally at 18.

Rolls 16 and 17 are free to revolve about their respective axes. One roll, here designated at 16, is mounted for lateral opening and closing movements relative to the other roll which is mounted in a fixed bearing whereby the lasted shoe may be entered between and removed from said rolls. Any suitable means, as the treadle-actuated toggle arrangement depicted generally at 19 in Fig. 1 may be employed for moving roll 16 relative to roll 17 and for exerting pressure on the shoe in the region of the welt when the rolls are closed.

Desirably, the peripheral face of one of the rolls is provided with spaced cross-ribs which when the rolls are closed forms wheel-marks in the upper face of the welt as the lasted shoe is manipulated relative to the rolls.

While I have disclosed a preferred embodiment of my invention, I recognize that various minor changes in the product may obviously be made. All such are to be regarded as within the purview of my invention if within the limits of the appended claim.

What I therefore claim and desire to secure by Letters Patent is:

A welted shoe, comprising an upper structure, insole and filler of conventional materials, and a welt and an outsole bonded to each other and each composed of fibrous felt impregnated with a thermoplastic, the upper being conventionally attached to the insole, and the bond between the welt and outsole being formed in situ by the thermoplastic materials in said parts.

JOHN D. HORVIT.